United States Patent [19]
Lesley

[11] 3,830,013
[45] Aug. 20, 1974

[54] AVOCADO GROWING APPARATUS
[76] Inventor: Thomas P. Lesley, 48 Compo Cove, Westport, Conn. 06880
[22] Filed: Apr. 23, 1973
[21] Appl. No.: 353,231

[52] U.S. Cl. .................................. 47/1.2, 47/34.11
[51] Int. Cl. ............................................ A01g 31/00
[58] Field of Search ............... 47/1.2, 34, 34.11, 41, 47/41.13, 38

[56] References Cited
UNITED STATES PATENTS
| | | | |
|---|---|---|---|
| 1,689,954 | 10/1928 | Marx | 47/41.13 |
| 2,175,113 | 10/1939 | Fischer | 47/1.2 |
| 2,531,562 | 11/1950 | Eve | 47/41 |
| 2,632,286 | 3/1953 | Newhall | 47/41 |
| 3,456,385 | 7/1969 | Plath | 47/1.2 |
| 3,704,545 | 12/1972 | Van Reisen | 47/34.11 |

OTHER PUBLICATIONS
Keeping the Home Shipshape, Popular Science, April 1950, page 173, relied on.

Primary Examiner—Robert E. Bagwill
Attorney, Agent, or Firm—Mark T. Basseches; Paula T. Basseches

[57] ABSTRACT

An avocado growing apparatus is disclosed comprising a container having a vertically directed body portion, preferably cylindrical in horizontal section, adapted to be partially filled with water. A float member matching the cross sectional configuration of the cylindrical container is provided with a vertical through-aperture wherein an avocado seed or pit is adapted to be supported, the float being subject to raising or lowering within the cylindrical container in accordance with the water level to assure that the pit or seed is partially immersed to a more or less constant degree, irrespective of the quantity of water in the container. Optionally, an anti-evaporation dome may be provided which rises and falls with the float.

11 Claims, 4 Drawing Figures

PATENTED AUG 20 1974 3,830,013

3,830,013

AVOCADO GROWING APPARATUS

BACKGROUND OF THE INVENTION

1. Field of the Invention

The present invention is in the field of horticulture, and more particularly is in the field of the cultivation of avocado house plants grown from seed into a grown house plant.

2. The Prior Art

The growth of an avocado plant from the seed presents an interesting, attractive and educational study. Additionally, a properly cultivated avocado seedling, following the initial growth stages, may be transplanted in soil to provide a readily grown and attractive house plant.

As a result of the wide availability of avocado pits and the facility with which they may be grown, the cultivation of avocado plants is becoming an increasingly popular hobby.

Typically, the seed is grown by inserting toothpicks into the hull, seating the tooth picks on the rim of a glass or like vessel, filling the glass to such level that the lower half of the seed is immersed in water. After a period of time, substantial root and sprout growth may be observed, the roots in particular presenting an interesting appearance, being semitransparent or translucent, and growing rapidly.

Cultivation of the avocado seedling has heretofore required careful supervision since the water level within the cultivating vessel must desirably be maintained at a level covering the substantial bulk of the root structures. If any substantial portion of the roots is exposed to the air for any protracted period, particularly within the dry atmosphere prevalent in heated homes, the root structure may become compromised and the plant killed. Water lost through evaporation and transpiration must thus be replaced at frequent intervals to maintain optimum growing conditions and avoid damage or destruction of the plant.

SUMMARY OF THE INVENTION

The present invention may be summarized as relating to an avocado growing apparatus comprising a vessel having vertically directed walls and a bottom wall, the vessel being provided with a float, which is preferably transparent, having a cross section matching the internal bore or horizontal section of the growing vessel, the float being vertically shiftable within the vessel. The float includes a vertical through-aperture within which the avocado pit is suspended, with the lower or root generating end of the avocado exposed at the bottom of the float and the upper or sprout generating end of the pit maintained above the float.

The container, in an area from the bottom to a central portion thereof, is preferably provided with ribs, rings or like projections extending into the internal bore, so as to maintain the float at least a minimum distance from the bottom of the container to avoid crushing the delicate root structures.

The container may be filled with water, and the float carrying the avocado seed disposed in the container, whereupon the float will maintain a fixed portion of the avocado seed immersed in the fluid, notwithstanding the fluid level within the container.

Optionally and preferably, a dome may be telescoped into the upper end of the float, the dome having a cross section matching the cross section of the bore of the vessel, the lower terminus of the dome resting on the float or floats.

Where a dome is employed, it will be apparent that the dome, float and avocado seed will rise or fall relative to the vessel in accordance with the water level.

The above arrangement provides an ideal growing environment for the avocado seed or pit wherein the water level relative to the pit is maintained at a selected position independent of the actual water level in the vessel.

The amount of attention required for the successful cultivation of the pit is greatly reduced due to the evaporation limiting action of the float and, where a dome is used, the evaporation and transpiration limiting action of the dome.

The float, vessel and dome structures are preferably transparent, to provide an unimpeded view of the growing components of the avocado.

With the foregoing in mind, it is an object of the present invention to provide improved growing apparatus for an avocado, hyacinth or similar plant grown from a seed or bulb.

A further object of the invention is to provide apparatus of the type described wherein the amount of attention required for the cultivation of the avocado plant is minimized, and wherein it is possible to leave the plant untended for a protracted period without ill effects.

It is a further object of the invention to provide a device of the class described wherein all portions of the growing plant are visibly accessible.

Still a further object of the invention is the provision of a device of the class described wherein the possibility of damage to the plant or roots is minimized.

Still a further object of the invention is the provision of a device of the class described wherein the avocado plant is supported on a float structure, rising or falling within the vessel in accordance with the height of the water within the vessel, whereby a constant portion of the plant is immersed, notwithstanding the amount of water in the vessel.

A further object of the invention is the provision of an avocado growing apparatus including an avocado support float and a dome, wherein the float and dome structures rise and fall together, in accordance with the fluid content of the vessel.

To attain these objects and such further objects as may appear herein or be hereinafter pointed out, reference is made to the accompanying drawings, forming a part hereof, in which.

Figure 1:
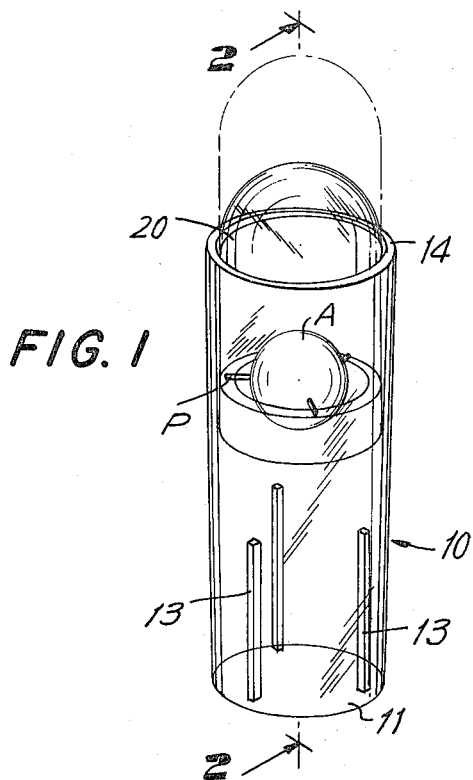
FIG. 1 is a perspective view of an avocado growing apparatus in accordance with the invention.

Referring now to the drawings, in FIG. 1 there is shown a vessel 10 which is tubular in cross section, including a floor or bottom 11. While the invention is illustrated in conjunction with a cylindrical vessel, it is intended that the word "tubular" as used herein is to refer to a vessel of any cross section, i.e., square, rectangular, etc. Further, it is desirable that the walls diverge slightly from the bottom to the top of the vessel to provide additional clearance. Preferably the vessel 10 is fabricated of a transparent plastic material.

The vessel, on its inner surface 12, may include a series of axially extending ribs or projections 13 extending upwardly from the bottom 11 for a short distance.

14 represents the upper end or mouth portion of the vessel or container 10.

One or more float members are provided for floatingly supporting an avocado pit or seed A. In the illustrated embodiment the float 15, which is preferably likewise formed of transparent plastic, is annular in conformation, the outermost perimeter or rim 16 of the float closely approaching the internal surface 12 of the vessel, with moderate tolerances between the noted parts to permit axial movement of the float within the container or vessel, but inhibiting tilting movement between the float and container.

Figure 2:
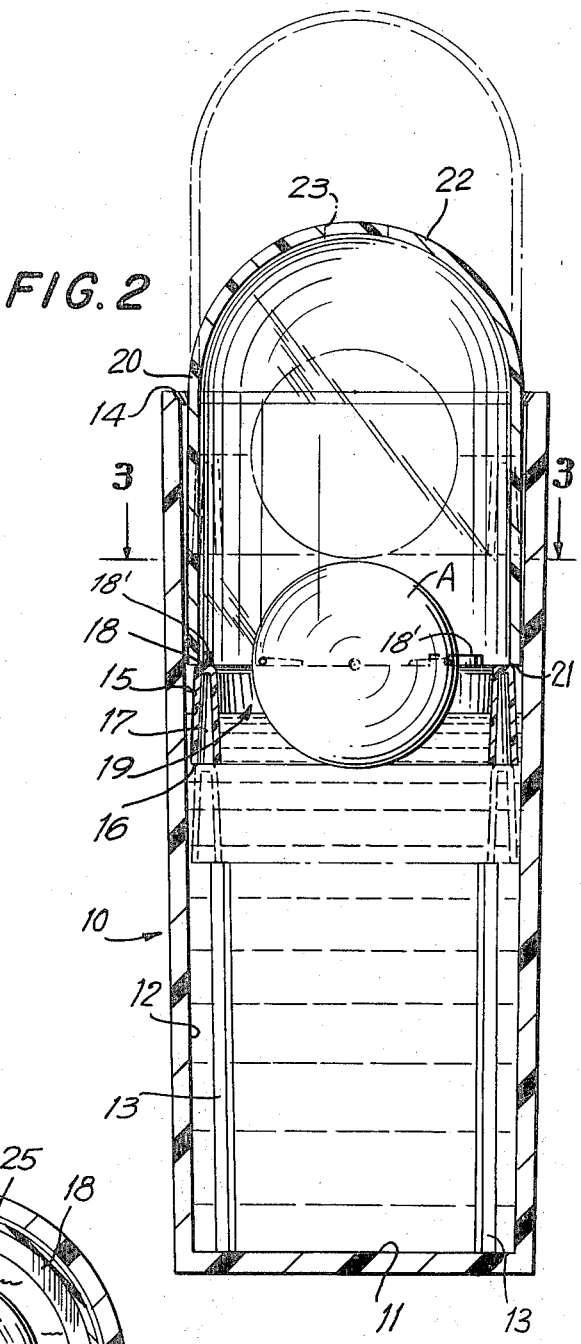
FIG. 2 is an enlarged vertical section taken on the line 2—2 of FIG. 1.

Preferably, as best seen in FIG. 2, the float is hollow, defining an annular, air-encapsulating chamber 17, an uppermost ledge portion 18 defining the top of the chamber.

As will be seen in FIG. 2, the float will provide substantial buoyancy by reason of the air entrapped within the chamber 17.

As the specific gravity of avocado seeds is greater than that of water and as avocado seeds may vary substantially in dimension, it may be necessary, in the case of larger pits, to provide two or more stacked floats — see dash line representation, FIG. 2 — whereby additional buoyancy is provided. Optionally, arcuate centering tabs 18' may extend upwardly from the top ledge 18 to prevent shifting of stacked floats.

The floats are provided with central throughapertures 19, the pit A being suspended centrally within the aperture so that portions of the pit below and above the float will be exposed to the water and atmosphere, respectively.

Figure 3:
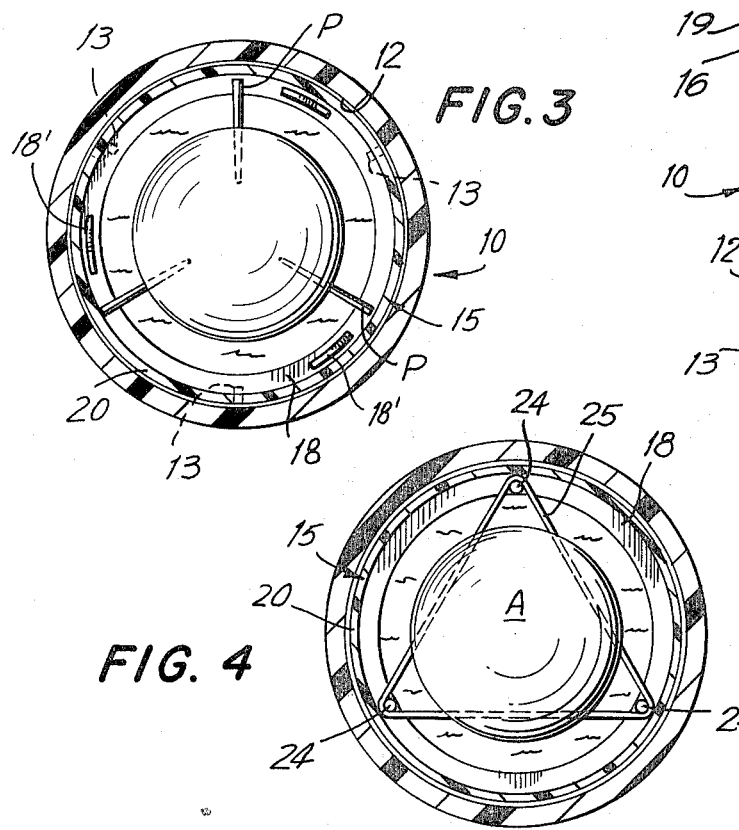
FIG. 3 is a horizontal section taken on the line 3—3 of FIG. 2.

As shown in FIG. 3, the seed A may be supported on the float 15 by a series of short pegs P, which may constitute fragmentary portions of toothpicks, nails or the like inserted into the seed hull, the pegs P extending from the seed a distance sufficient to enable the extending portions to rest on the ledge 18 at the top of the uppermost float.

As best seen in FIG. 2, the ribs or projections 13 on the inner wall 12 of the vessel prevent the float or floats from approaching the bottom or floor 11 more closely than a predetermined spaced distance, the limitation on the downward movement preventing the very fragile roots from becoming crushed under the weight of the seed and float, should the water level in the vessel be permitted to fall beneath the uppermost end of the ribs.

Alternately, annular, upwardly facing shoulders may be formed in the side walls to act as downward limiting stops for the floats, and the walls of the container may diverge above the shoulders.

Optionally, the apparatus is provided with a dome structure 20, the lowermost edge portion 21 of which is cylindrical in horizontal section, closely and slidably to approach the internal surface 12 of the vessel 10. The dome 20, which is preferably also made of transparent, lightweight plastic material, is positioned with its lowermost edge 21 seated on the upper ledge portion 18 of the uppermost float. It will thus be observed that the float carrying the avocado seed and the dome will rise and fall as a unit, in accordance with the water level within the vessel.

In FIGS. 1 and 2, the float and dome are shown in two of the possible positions which they may occupy, notably, a lowered position when the water level is low (solid lines), and a raised position when the water level is high (dot and dash lines).

Optionally, the curved surface 22 of the dome may be provided with an aperture 23, which aperture, while permitting some evaporation and transpiration losses, will lessen the likelihood of rot.

Additionally, a fixed dome (not shown) may be seated on the upper edge 14 of the vessel, the fixed dome being of sufficient vertical extent to permit upward and downward shifting of the movable dome 20 without interference.

Figure 4:
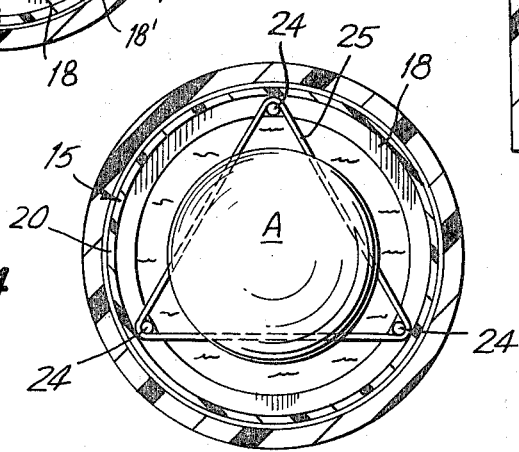
FIG. 4 is a section similar to FIG. 3 showing another embodiment of the invention.

The embodiment of FIG. 4 is generally similar to the embodiment of FIGS. 1 to 3, such embodiment being varied merely in the manner in which the avocado seed is supported on the float.

In the embodiment of FIG. 4, three lugs 24 are molded onto the upper surface or ledge portion 18 of the float. A rubber band 25 or the like is passed around the lugs 24, the branches of the band between the legs forming a seat for the avocado seed.

From the foregoing it will be appreciated that there is illustrated and described a growing apparatus which is both decorative and ideally functionally suited to the cultivation of avocado plants.

Due to the fact that the avocado seed is immersed in water to a constant depth, notwithstanding the water level may vary within a substantial range within the vessel, frequent replenishment of water in the vessel is not required.

Additionally, evaporation losses are minimized by reason of the fact that the combined bulk of the seed and float provide a reduced area from which evaporation losses may result. Where the apparatus is used in conjunction with a floating dome, evaporation losses are even further reduced and transpiration losses minimized.

The device is susceptible of inexpensive manufacture from molded plastics and is flexible in that avocado seeds of a variety of sizes may be accommodated through the expedient of adding or substracting the number of floats employed.

Having thus described the invention and illustrated its use, what is claimed as new and is desired to be secured by Letters Patent is:

1. An avocado growing apparatus comprising a transparent, water impervious container adapted to be partially filled with water, having a bottom and an elongated, vertically directed tubular body portion extending upwardly from said bottom, float means disposed within said container and adapted to float on said water for axial movement within said body portion, said float means including a vertically directed through-aperture adapted to support an avocado seed therein, said float means being shiftable vertically within said container in accordance with the water level in saiid container, vertically extending portions of the side marginal edges of said float means being disposed in proximate spaced relation to the inner side surfaces of said body portion, whereby substantial tilting movement of said float means relative to said container are prevented, and evaporation from the area between the inner walls of said container and said side marginal edges of said float is minimized.

2. The apparatus of claim 1 wherein the internal surface of said body portion of said vessel is provided with projection means spaced from said bottom and disposed in the path of said float means to limit the approach of said float means to said bottom portion.

3. The apparatus of claim 1 wherein said float means comprises at least one transparent, hollow structure including an upper ledge portion.

4. The apparatus of claim 3 wherein said float means includes lug portions, an elastic member convoluted about said lug portions, said member having branches extending over said through-aperture, said seed being supported within said branches.

5. The apparatus of claim 3 wherein said float means comprises at least two hollow float structures, one stacked atop the other.

6. The apparatus of claim 5 wherein said float means include centering tab means for engaging and locking adjacent float means against relative transverse movement.

7. The apparatus of claim 1, including a dome having a tubular body portion open at the bottom, said body portion, in horizontal section, conforming essentially to the internal cross sectional dimension of said body portion of said vessel and being slidable therein, said open bottom portion of said dome being seated on, supported by and movable with said float means.

8. The apparatus of claim 7 wherein said dome includes a vent aperture.

9. The apparatus of claim 1 wherein said vessel is cylindrical in horizontal section and said float means is annular in horizontal section.

10. The apparatus of claim 1 wherein the walls of said container diverge in an upward direction.

11. An avocado growing apparatus comprising a transparent, generally cylindrical container adapted to be partially filled with water, annular, transparent float means shiftable axially of said container adapted to float on the water in said container, said float means having a through-going aperture for supporting an avocado seed therein, and a generally cylindrical, transparent dome member having an open bottom portion adapted to be supported on, and move with said float means in a direction axially of said container in accordance with the water level in said container, the exterior of said dome member being disposed in proximate spaced relation to the interior surface of said container.

* * * * *